United States Patent [19]

Powell

[11] Patent Number: 4,581,184

[45] Date of Patent: Apr. 8, 1986

[54] OXYGEN PERMEABLE LENS

[75] Inventor: James C. Powell, Minnetonka, Minn.

[73] Assignee: Precision-Cosmet Co., Inc., Minnetonka, Minn.

[21] Appl. No.: 570,736

[22] Filed: Jan. 16, 1984

Related U.S. Application Data

[63] Continuation-in-part of Ser. No. 319,193, Nov. 9, 1981.

[51] Int. Cl.$^4$ .................. B29D 11/00; C08F 30/08; C08F 130/08; C08F 230/08
[52] U.S. Cl. ........................... 264/2.6; 526/279
[58] Field of Search ......................... 526/279

[56] References Cited

U.S. PATENT DOCUMENTS

| | | | |
|---|---|---|---|
| 2,674,743 | 3/1954 | Gaiser et al. | 3/13 |
| 3,400,175 | 9/1968 | Finestone et al. | 260/880 |
| 3,619,044 | 11/1971 | Kamath . | |
| 3,641,208 | 2/1972 | Hall et al. | 260/876 |
| 3,645,835 | 2/1972 | Hodgson | 161/146 |
| 3,651,035 | 3/1972 | Atkins | 260/88.1 |
| 3,654,250 | 4/1972 | Davis | 260/88.2 |
| 3,681,305 | 8/1972 | Tirpak et al. | 260/80.78 |
| 3,718,383 | 2/1973 | Moore | 350/175 |
| 3,745,042 | 7/1973 | Lim et al. | 1/50 |
| 3,792,125 | 2/1974 | Wefer | 15/40 |
| 3,808,178 | 4/1974 | Gaylord | 526/279 |
| 4,101,513 | 7/1978 | Fox | 526/279 |
| 4,138,382 | 2/1979 | Polmonteer | 526/279 |
| 4,139,692 | 2/1979 | Tonaka et al. | 526/279 |
| 4,152,508 | 5/1979 | Ellis et al. | 526/279 |
| 4,424,328 | 1/1984 | Ellis | 526/279 |

OTHER PUBLICATIONS

Article, "Hydrogels in Biomedical Applications", by Derek G. Pedley, Peter J. Skelly and Brian J. Tighe, The British Polymer Journal, vol. 12, Sep., 1980.

*Primary Examiner*—Joseph L. Schofer
*Assistant Examiner*—Peter F. Kulkosky
*Attorney, Agent, or Firm*—Merchant, Gould, Smith, Edell, Welter & Schmidt

[57] ABSTRACT

Hard, wettable, gas-permeable, optically acceptable mechanically stable vision correction lenses can be made from a substantially hydrophobic polymeric matrix having randomly polymerized throughout the matrix residues derived from a hydrolyzable silicone-containing ethylenically unsaturated monomer.

18 Claims, No Drawings

OXYGEN PERMEABLE LENS

This application is a continuation-in-part of U.S. Ser. No. 06/319,193, filed Nov. 9, 1981.

FIELD OF THE INVENTION

The invention relates to hard contact lenses that are optically clear and mechanically stable. More particularly, the invention relates to a hard contact lens material containing a silicone containing monomer that surprisingly can be formed into a lens which is stable and wettable when hydrated and gas permeable.

BACKGROUND OF THE INVENTION

Vision correction lenses, i.e., both contact lenses and intraocular lenses, must be mechanically stable, optically clear, wettable, and gas-permeable. The material that makes up the lenses must be optically clear, mechanically stable and formable to a shape which can provide sufficient correction for the eye and can maintain the correction. The lens material must be wettable since a non-wettable lens tends to irritate and cause abrasion of the eye and lid. The lens material must be gas permeable. The cell covering (corneal epithelium) of the eye respires by exchanging oxygen, carbon dioxide, and other substances with tear fluid. The placement of a contact lens over the cornea can prevent the corneal cells from contacting tear fluid and can result in oxygen starvation, build-up of carbon dioxide, discomfort and in some cases, corneal damage.

Successful hard or rigid vision correction lenses have been prepared from a variety of well known rigid polymeric substances such as glass, acrylate based polymers, styrene-based polymers and others. The polymeric nature of the materials have been rendered potentially gas-permeable using ethylenically unsaturated silicone-containing monomers that successfully provide a change in the polymeric structure of the solid lens material resulting in reduced density and increased gas permeability. Ethylenically unsaturated silicone silicone containing monomers can in general be of two types. The first type comprises a silicone group attached to the ethylenically unsaturated group through a bond that is hydrolyzable in aqueous media. The second type comprises a monomer having a bond, between the silione group and the unsaturated group, that is substantially hydrolytically stable. The art as a whole suggests that hydrolytically stable monomers be used and hydrolytically unstable monomers be avoided. Polymers having hydrolytically unstable constituents, under conditions commonly encountered by the lens, have not been used and have been actively avoided by persons skilled in the vision correction lens art since the hydrolysis of the silicone monomers is believed to result in the mechanical instability of the lens. A contact lens having mechanical instability could be easily damaged during shaping or handling or could change in dimension during wearing and alter the vision correction, rendering the lens useless for the individual. See, for example, Deichert, U.S. Pat. No. 4,341,889, and others.

BRIEF DISCUSSION OF THE INVENTION

We have found that, contrary to the belief of persons skilled in the contact lens art, hydrolytically unstable ethylenically unsaturated silicone-containing monomers are substantially protected from hydrolysis in the interior of hard or rigid vision correction lenses. At the same time on the surface of the lens, the hydrolysis of the silicone-containing unsaturated monomers provides a positive useful result. Upon hydration, the silicone groups on the surface of the lens are chemically hydrolyzed from the polymer mass leaving a hydrophilic hydroxyl group. The creation of surface hydroxyl groups, with the concommitant removal of hydrophobic silicone groups, results in an increase in wettability of the contact lens, thus increasing the comfort of the wearer.

Briefly, the rigid vision correction lens material can be made by polymerizing a mixture of ethylenically unsaturated monomers including an ethylenically unsaturated hydrolyzable silicone-containing monomer resulting in a hard polymer matrix. Vision correction lenses can be made from the hard or rigid polymer matrix by shaping it into a lens form and hydrating the lens.

A first aspect of the invention is a hydrophobic polymeric matrix from which contact lenses can be manufactured. Another aspect of the invention is a method to form the hydrophobic polymeric vision correction lens matrix. A further aspect of the invention is a method of forming a vision correction lens from the hydrophobic polymeric matrix. Still another aspect of the invention comprises a vision correction lens made using the methods and materials above.

DETAILED DESCRIPTION OF THE INVENTION HYDROLYZABLE SILICONE MONOMER

Ethylenically unsaturated silicone-containing monomers which can be used to provide gas permeability and potential wettability to the hard contact lens of this invention comprise a monomer having at least one ethylenically unsaturated or a vinyl group connected to a silicone or siloxane group through a bond which is hydrolyzable in an aqueous medium under conditions to which contact lens surfaces are subject to during hydration and use. The ethylenically unsaturated silicone-containing monomer can be represented by the following formula:

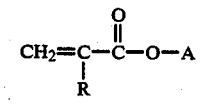

wherein R is hydrogen or a $C_{1-5}$ alkyl and A is a silicone group. The direct link between the carbonyl group and the silicone group through the oxygen is hydrolyzable in aqueous media. At least one class of previously used non-hydrolyzable silicone monomers in the art can be represented by the following formula:

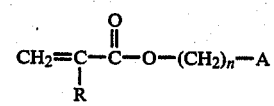

wherein n is an interger of 1–5 and A is a silicone group. The presence of the $-(CH_2)_n-$ group introduces substantial hydrolytic stability to the monomer.

The silicone group can be linear or can be partly substantially branched and can contain from 1 to 25 silicon atoms or more. The silicone group can contain portions which are substantially linear silicone moieties or can contain portions which are highly branched silicone moieties. A generalized representation of the silicone groups of this invention can be represented by the following general formula:

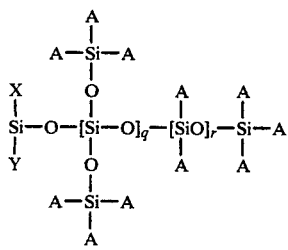

wherein q and r are independently an integer of 0-6, X and Y are independently selected from the group consisting of a Z group, a $C_{1-5}$ alkyl group, a cycloalkyl group, a substituted or unsubstituted phenyl group, and a polysiloxanol group, wherein the Z group can be represented by the following general formula:

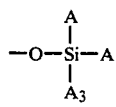

wherein A is a $C_{1-5}$ alkyl group. Preferred silicone groups can comprise a moiety which can be represented by the following formula:

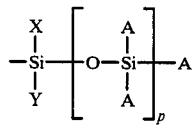

wherein X and Y are independently selected from the group consisting of $C_{1-5}$ alkyl groups, phenyl groups, or B, wherein B is a group having the structure:

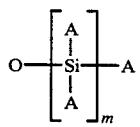

wherein A is a $C_{1-5}$ alkyl group or a phenyl group and p and m are independently integers of 1 to 5. The most preferred silicone groups correspond to the following general formula:

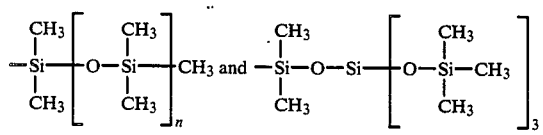

wherein n is an integer of 1 to 5.

The above hydrolyzable ethylenically unsaturated silicone containing monomers are polymerized in a mixture of monomers resulting in a polymer matrix that can be formed into a lens that can be hydrated. The mixture of monomers can contain ethylenically unsaturated hydrolyzable silicone containing monomers or mixtures thereof along with other ethylenically unsaturated monomers that can polymerize generally in a redox or free radical initiated catalyzed polymerization reaction to form the hard mechanically stable lens material.

While any ethylenically unsaturated monomer can be used to form the material of the invention, representative monomers which may be employed in the practice of this invention include acrylate and methacrylate monomers, acrylic acid ester and methacrylic acid ester monomers, styrene type monomers, and others. Representative examples of acrylate type monomers include acrylate and methacrylate alkyl esters wherein the alkyl group comprises a $C_{1-25}$ alkyl or aryl group such as methyl, ethyl, propyl, isopropyl, t-butyl, n-hexyl, isohexyl, hexyl, octyl, 2-ethylhexyl, nonyl, decyl, undecyl, lauryl, cetyl, octadecyl, cyclohexyl, benzyl, phenyl, etc.

Styrene type monomers which can be used in the material of the invention include monomer materials corresponding to the following general formula:

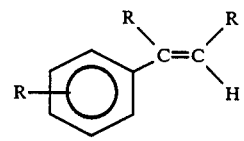

wherein each R is independently selected from hydrogen or an n-alkyl, isoalkyl, tertiary alkyl group having 1 to 5 carbon atoms, n is an integer of 1 or 2 and m is an integer of 1 to 5. Representative examples of the styrene type monomer include styrene (vinyl benzene), alphamethylstyrene, vinyl toluene, divinyl benzene, etc.

A hydrophobic ethylenically polyunsaturated (di- or tri-unsaturated, etc.) crosslinking agent can be included in the polymerization mixture to result in a polymer matrix with substantial mechanical stability. Typical polyunsaturated crosslinking agents comprise two or more ethylenically unsaturated groups attached to a polyvalent group which provides sufficient separation between the ethylenically unsaturated groups to result in effective crosslinking between adjacent molecules. Crosslinking agents that can be used include a wide variety of commonly known ethylenically poly (di, tri, etc.) unsaturated crosslinking agents such as vinyl acrylate and methacrylate, allyl acrylate and methacrylate, diacrylates and dimethacrylates of polyoxyethylene, polyoxypropylene and polyoxybutylene glycols, triacrylate and trimethacrylate esters of glycerol and propylene glycol, trivinyl cyanurate, olefin glycol dimethacrylates, allyl diglycol carbonate, triallyl cyanurate, diallyl carbonates, and polyalkyl carbonates of dihydroxy or polyhydroxy compounds, divinyl and polyvinyl carbonate of dihydroxy or polyhydroxy compounds, di- or triacrylates and methacrylates of a polyhydroxy compound such as trihydroxypropane or trimethylolpropane, di, tri or polyvinyl ester of di, tri or polycarboxylic acids, di, tri or polyvinyl ethers of di, tri or polyhydroxy compounds; di, tri or polyallyl ethers of di, tri or polyhydroxy compounds; di, tri or polyalyl esters of di, tri or polycarboxylic acid compounds; di, tri or tetravinyl aromatic compounds.

OTHER COMPONENTS

An ethylenically unsaturated dicarboxylic acid anhydride in combination with the other monomers can provide additional wettability to the lens. Examples of the dicarboxylic anhydride compound include maleic anhydride, citriconic anhydride, ethyl maleic anhydride, iticonic anhydride, halo maleic anhydride, etc. Preferably maleic anhydride is used for reasons of reactivity and increased wettability of the resulting polymer matrix. The improved wettability can be achieved by the hydrolysis of the surface dicarboxylic anhydride groups forming ionized carboxylate groups which enhance wettability. In order to provide other properties to the lens materials, coloring agents, ultraviolet light absorbers, light polarizers, etc. can be either polymerized along the chain of the polymer matrix or dispersed throughout the polymer matrix.

MANUFACTURE OF THE LENS MATERIAL

In somewhat greater detail, the vision correction lens composition of this invention can be made by polymerizing a mixture of polymerizable monomers including the ethylenically unsaturated hydrolyzable silicone containing monomer to form the polymeric matrix. Commonly the monomers can be combined in a polymerization reaction mixture comprising a major proportion of polymerizable monomers and an effective gas permeability, and a potential wettability providing amount of the ethylenically unsaturated hydrolyzable silicone containing monomer. Generally the polymerization mixture contains less than about 25 parts of the silicone monomer, preferably about 1 to about 15 parts and most preferably for reasons of optimum gas permeability and wettability, about 4 to 15 parts of the ethylenically unsaturated silicone containing monomer.

Preferred catalysts used are catalysts which generate free radical polymerization initiators upon exposure to ultraviolet radiation or heat. These catalysts are well known in the art but examples of useful catalysts are 2,2-diethoxyacetophenone, and 2,2-azobis-(2-methylbutyronitrile). Catalysts are generally used at a concentration of about 1% or less of the reaction mixture. A preferred polymerization technique comprises mixing the desired monomers, dispensing the monomers into clear molded or machined polymerization cups and exposing the cups to a source of energy generating the free radical polymerization initiators from the catalyst compound. Generally it is preferred to degas the polymerization mixture, to remove oxygen and to conduct the polymerization under nitrogen.

Reaction conditions for polymerization are generally not critical. Ambient pressures and temperatures can be satisfactory for polymerization with an ultraviolet radiation initiation. A heat polymerization initiation technique can be used at temperatures from about ambient to about 95° C. Polymerization time can be from about 2 to about 48 hours. It is common to cure the polymerized mass at temperatures ranging from about ambient to 90° C. for about 8 to 20 hours after polymerization is complete. Other modifications and variations in the polymerization of the vision correction lens material are well known to persons skilled in the art.

MANUFACTURE OF LENSES

In order to manufacture lenses from the vision correction lens polymer matrix the resulting rigid solid product can be cut or formed into approximately circular lens blanks of approximate dimensions of about ¾ to 1 inch in diameter and about ⅝ to 1 inch in thickness (about 19 to 25 millimeters in diameter and about 15 to 25 millimeters in thickness) and the circular lens blanks can be ground to the desired surface finish. After grinding the surface, the lens can be contacted with a hydrolyzing solution sufficient to cause the hydrolytic removal of the silicone group and to hydrolyze any other hydrolyzable groups present. A preferable hydrolyzing agent comprises an aqueous solution of base such as a 1 to 15 wt-% aqueous solution of ammonium hydroxide or sodium hydroxide.

Although the lens can be advantageously used as a hard plastic lens by fabrication in the manner indicated above, it is sometimes desirable to provide a composite type lens in which the peripheral skirt area of the lens comprises a hydrophilic polymer. The skirt portion can be formed from a water soluble vinyl monomer copolymerized with a hydrophobic water insoluble monomer in the presence of a crosslinking agent and a quantity of a water soluble inert substance. This inert substance is substantially removed during the exposure of the lens to water during hydration. Upon exposure to water, a substantial portion of the water soluble inert substance is removed from the polymer matrix and replaced by water of hydration to form the soft hydrophilic polymer structure desirable for use in contact lenses. Stresses and distortions of the lens can be minimized or eliminated by this simple exchange of water soluble inert substance or water in the polymer matrix. See U.S. Pat. No. 4,093,361.

As is stated above, the contact lens material of the invention must be wettable, oxygen permeable and hard.

Oxygen permeability indicates that the lens material has the capability of transporting oxygen and carbon dioxide sufficiently to meet the requirements of the human cornea. Oxygen gas permeability values ($D_K$) in units of milliliters ($O_2$)-$cm^2$/sec./ml./mm. Hg. are measured at 32° C. in oxygen-consuming electrode cell (oxygen flux meter). See J. Falt, Polarigraphic Oxygen Sensor, C.P.C. Press, 1976. Values of $D_K$ greater than about $4\times10^{-11}$, preferably $8\times10^{-11}$, most preferably greater than $12\times10^{-11}$, are desirable for vision correction lens material that is permeable to gas exchange. Wettability indicates the tendency of water to associate with or wet the surface of the lens. Water wettability can be determined on dry samples using a Kayness contact angle measurement. Contact angles of less than 75° and preferably less than 70° indicate beneficial wettability. Mechanical stability can be established by measuring the base curvature of the lens from time to time on an American optical radioscope. A change in base curvature of less than 0.04 milliliters during use is acceptable. Generally the term hard is used herein to describe the vision correction lens material of the instant invention. Hardness can be determined using a Shore hardness A scale measurement in which the hardness of the lens should be about 50 Shore hardness units or greater.

The present invention will be further understood by reference to the following specific Examples that include a best mode.

EXAMPLE 1

A polymerization reaction mixture was prepared on a weight basis comprising tertiary butyl styrene 70.75%, pentamethyldisiloxanyl methacrylate 5.5%, methyl methacrylate 5.5%, trimethylpropane trimethacrylate 11.0%, maleic anhydride 7.15%, diethoxy acetophenone 0.1%. The reaction mixture was stirred for five minutes, dispensed into transparent acrylic cups molded from a UV transmitting grade of polymethylmethacrylate resin, placed on a glass tray above a bank of ultraviolet fluorescent tubes and exposed to ultraviolet light at an intensity of at least 1500 microwatts per square centimeter for about 12 hours. Lenses were manufactured by grinding and polishing the thus formed blanks. The resulting lenses were soaked in a 2% aqueous sodium hydroxide solution for 72 hours in order to hydrate the hydratable groups on the surface of the lens. The oxygen permeability of the lens was $15 \times 10^{-11}$ and a wettability contact angle of 66° in saline. The lens was mechanically stable.

EXAMPLE II

Example I was repeated except the silicone methacrylate used was a nonhydrolyzable monomer, methacryloxypropyl pentamethyldisiloxane (available through Petrarch Systems Inc. as M8547). Contact angle measurements were in excess of 75° which indicated that the lenses made from this material were not wettable by human tears.

EXAMPLE III

Example I is repeated except that 70.75% of methylmethacrylate is substituted for the tertiary butyl styrene. Hydration of lens blanks results in a substantial reduction in wetting angle resulting in a wettable lens. The lens is mechanically stable. The lens has an oxygen permeability of greater than $4 \times 10^{-11}$.

DISCUSSION

Discs from buttons made in Examples I and II were made and half from each group were hydrolyzed as outlined in Example I while half remained unhydrolyzed. All groups were analyzed by X-ray photo-electron spectroscopy. The material of Example II showed no change in silicone to carbon or oxygen to carbon ratios after hydration. The material of Example I showed a 2-fold decrease in oxygen/carbon ratios, a 6-fold decrease in silicone/oxygen ratios and a dramatic 16-fold decrease in silicone/carbon ratios after hydration. This demonstrates the gross reduction in the amount of silicone on the surface of the lens after hydrolysis.

Since many embodiments of the invention can be made without departing from the spirit and scope of the invention, the invention resides wholly in the claims hereinafter appended.

We claim:

1. An optically clear, hard, mechanically stable, gas permeable, wettable vision correction lens which comprises a polymeric matrix having randomly polymerized in the matrix, residues derived from an ethylenically unsaturated silicone containing monomer, having a hydrolyzable silicone group of the formula:

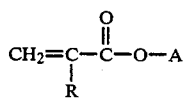

wherein R is a hydrogen or a $C_{1-5}$ alkyl and A is a silicone group wherein a silicone of same is directly attached to the ester oxygen, in an amount sufficient to provide gas permeability to the matrix and wettabillity to the lens surface when hydrated.

2. The vision correction lens of claim 1 wherein the silicone group is:

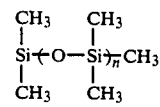

wherein n is an integer of 1 to 10.

3. The vision correction lens of claim 1 wherein the silicone groups is:

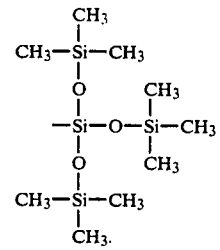

4. The vision correction lens of claim 1 wherein the polymeric matrix is derived from an acrylic monomer, a styrenic monomer, or mixtures thereof, sufficient to provide a rigid lens matrix.

5. The vision correction lens of claim 1 wherein the polymeric matrix also contains sufficient crosslinking agent having at least two ethylenically unsaturated groups to provide additional mechanical stability.

6. The vision correction lens of claim 1 wherein the lens has a hardness of at least 50 Shore hardness units.

7. The vision correction lens of claim 1 wherein the surface of the vision correction lens has a wettablity contact angle of less than 75 degrees.

8. The vision correction lens of claim 1 wherein the vision correction lens has a minimum oxygen permeability of at least about $4 \times 10^{-11}$ $D_K$ units.

9. An optically clear, hard, mechanically stable vision correction lens material which comprises a polymeric matrix having randomly polymerized in the matrix, residues derived from an ethylenically unsaturated silicone-containing monomer, having a hydrolyzable silicone group, of the formula:

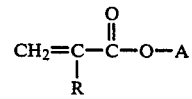

wherein R is hydrogen or a $C_{1-5}$ alkyl and A is a silicone group wherein a silicone of same is directly attached to the ester oxygen, in an amount sufficient to provide gas permeability to the matrix and wettability to the surface when hydrated.

10. The vision correction lens of claim 9 wherein the silcone group wherein a silicone of same is directly attached to the ester oxygen is:

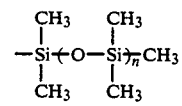

wherein n is an integer of 1 to 10.

11. The vision correction lens of claim 9 wherein the silicone group is:

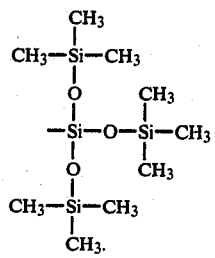

12. The vision correction lens of claim 9 wherein the polymeric matrix is derived from an acrylic monomer, a styrenic monomer, or mixtures thereof.

13. The vision correction lens of claim 9 wherein the polymeric material also contains sufficient crosslinking agent having at least two ethylenically unsaturated groups to provide mechanical stability.

14. The vision correction lens of claim 9 wherein the lens has a hardness of at least 50 Shore hardness units.

15. The vision correction lens of claim 9 wherein the surface of the vision correction lens has a wettability contact angle of less than 75 degrees.

16. The vision correction lens of claim 9 wherein the vision correction lens has a minimum oxygen permeability of at least $4\times10^{-11}D_K$ units.

17. A method of forming an optically clear, hard, mechanically stable, gas permeable, wettable vision correction lens material which comprises:

(a) forming a mixture of ethylenically unsaturated monomers that includes an ethylenically unsaturated silicone containing monomer, having a hydrolyzed silicone group, of the formula:

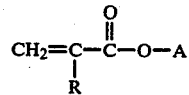

wherein R is hydrogen or a $C_{1-5}$ alkyl and A is a silicone group; and (b) initiating polymerization.

18. A method of forming a contact lens which comprises shaping a polymeric matrix having randomly polymerized in the matrix, residues derived from an ethylenically unsaturated silicone containing monomer, having a hydrolyzable silicone group, of the formula:

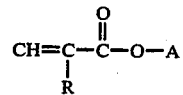

wherein R is a hydrogen or a $C_{1-5}$ alkyl and A is a silicone group, in an amount sufficient to provide gas permeability to the matrix and wettability to the lens surface when hydrated, into the form of a lens and hydrating the lens.

* * * * *

UNITED STATES PATENT AND TRADEMARK OFFICE
CERTIFICATE OF CORRECTION

PATENT NO. : 4,581,184

DATED : April 8, 1986

INVENTOR(S) : JAMES C. POWELL

It is certified that error appears in the above-identified patent and that said Letters Patent is hereby corrected as shown below:

```
In column 1, line 41, for "silicone silicone" read
      --silicone--.
In column 1, line 46, for "silione" read --silicone--.
```

Signed and Sealed this

Seventh Day of October, 1986

[SEAL]

*Attest:*

DONALD J. QUIGG

*Attesting Officer*  *Commissioner of Patents and Trademarks*